Dec. 8, 1953 G. E. STÅHLBERG 2,661,906
AUTOMATIC CONTROL ARRANGEMENT IN CENTRAL HEATING SYSTEMS
Filed July 18, 1951 3 Sheets-Sheet 1

INVENTOR
GÖSTA ENOCK STÅHLBERG
BY
ATTORNEYS

Dec. 8, 1953    G. E. STÅHLBERG    2,661,906
AUTOMATIC CONTROL ARRANGEMENT IN CENTRAL HEATING SYSTEMS
Filed July 18, 1951    3 Sheets-Sheet 2
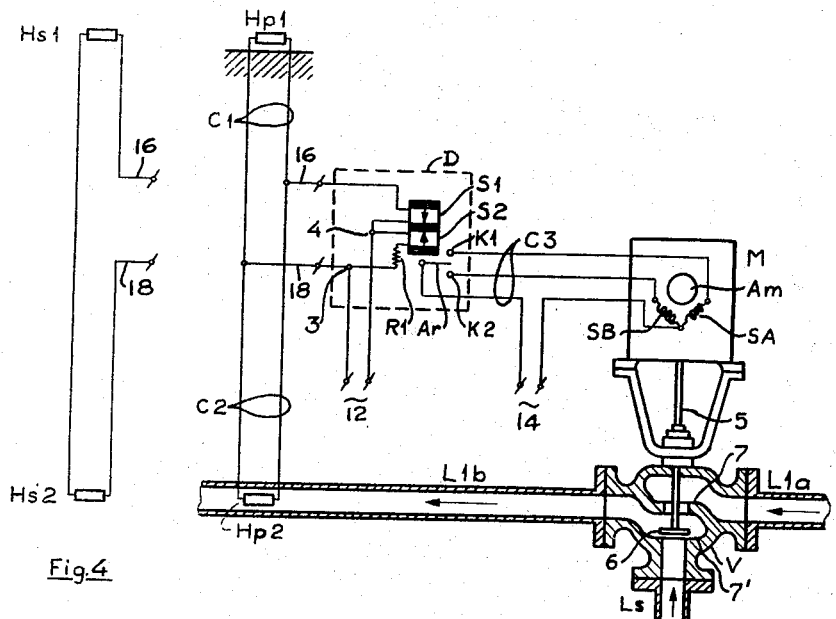
Fig. 4
Fig. 2
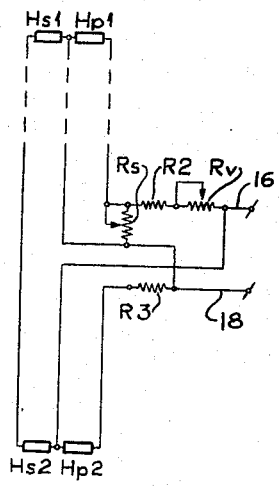
Fig. 5
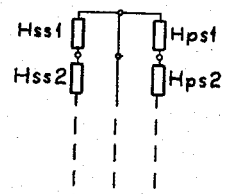
Fig. 7
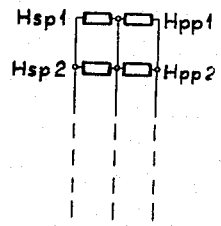
Fig. 8
INVENTOR
GOSTA ENOCK STÅHLBERG
BY
ATTORNEYS Patented Dec. 8, 1953

2,661,906

UNITED STATES PATENT OFFICE 2,661,906

AUTOMATIC CONTROL ARRANGEMENT IN CENTRAL HEATING SYSTEMS

Gösta E. Ståhlberg, Solna, Sweden, assignor to Societe d'Investigation & d'Exploitation de Brevets, Tangier, Morocco Application July 18, 1951, Serial No. 237,454

Claims priority, application Sweden April 27, 1951

13 Claims. (Cl. 236—91)

The present invention relates to an arrangement for setting a control member automatically in response to the conditions in the atmosphere, said member being adapted to control, for example, the temperature of a fluid in a riser of a central heating plant in a building.

It has long been desired to simplify such arrangements as far as possible and particularly to avoid the utilization of liquid-filled rheostats having movable contacts and which are likely to cause disturbances.

An object of the present invention is to bring about such a simplification and to establish an increased reliability of operation. The invention consists substantially in the provision of at least one outdoor thermistor having a negative temperature coefficient with respect to its electrical resistance which thermistor is adapted to respond to the outdoor temperature, and at least one indoor thermistor also having a negative temperature coefficient of resistance and being adapted to respond to the temperature in the heating plant riser. There is also provided a control circuit in which said thermistors control a relay device adapted, upon temperature variations in the thermistors, to set the control member in such a manner that, when the total resistance of the control circuit is reduced, the temperature in the riser is reduced and vice versa. According to the invention the outdoor thermistor may be either parallel-connected or series-connected to the indoor thermistor.

The expression "thermistor" is applied to a semi-conductor having a high negative temperature coefficient of resistance. When using such thermistors they should be loaded only by such weak currents that the temperature of the resistance body and thus the electrical resistance thereof are determined substantially only by the temperature of the surrounding medium.

As semiconductors partially reduced titanites, such as magnesia titanite, may be used, by way of example. Also semiconductors from the spinell group or sintered or fused mixtures of heavy oxides, such as oxides of Cu, Ni, Mn and Fe may be used.

It is a further object of the invention to provide a linear response of the control member to temperature changes.

It is a further object of the invention to provide a control system which is responsive to the temperature conditions at a plurality of locations, for example, various locations about the outside of a building.

It is a further object of the invention to provide a control system which not only does not require liquid filled temperature responsive elements or rheostats having movable elements but which also does not employ or require electronic amplifiers or other electronic apparatus.

These and other objects of the invention will become apparent from the following description when read in conjunction with the accompanying drawings, in which:

Figure 2 illustrates diagrammatically the details of an embodiment of the invention;

Figure 4 illustrates a modified detail of the circuit shown in Figure 2;

Figure 5 shows a further modification of a portion of the circuit shown in Figure 2;

Figure 7 illustrates a modification of a portion of the circuit shown in Figure 2 including the provision of part thermistors;

Figure 8 illustrates a further modification of the portion of Figure 2 shown in Figure 7 including another arrangement of part thermistors;

Figure 1:
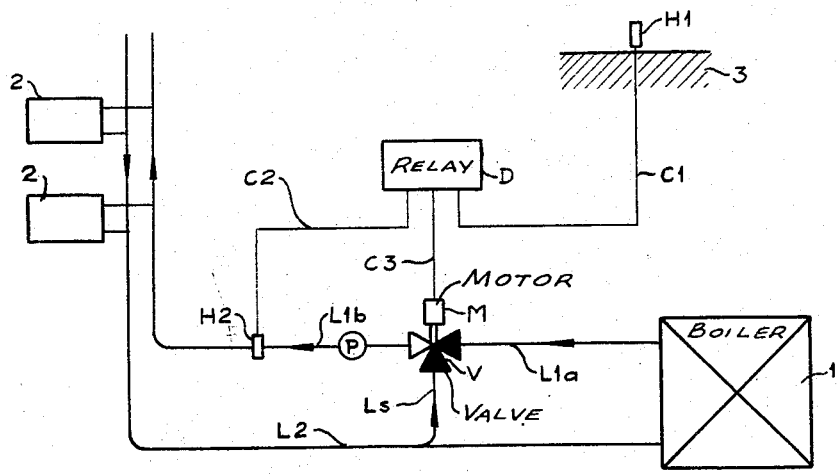
Figure 1 illustrates diagrammatically a heating plant to which the invention has been applied.

In the general arrangement indicated in Fig. 1 a heating boiler 1 is included in a central heating system in, for instance, a dwelling house and provided with a feed line L1a for hot water which line is provided with a shiftable three-way valve V.

The riser proper L1b is fed via the valve V partially from the feed line L1a and partially from a shunt Ls. The riser L1b is assumed to feed a number of radiators 2 or other heat absorbing devices and the cooled-off return water is conducted through the return line L2 wherefrom the opposite end of the shunt line Ls is branched off. On the outside of the wall 3 of the building there is an outer thermistor H1 so provided that it is subjected to the temperature and/or radiation in the atmosphere. This thermistor is connected via a number of electrical conductors being generally represented by the line C1 to a relay device principally designated D. An indoor or inner thermistor H2 is provided at or in the riser L1b so that it is actuated by the temperature of the water going out to the radiators 2. The thermistor H2 is connected to the relay device D via a number of electrical conductors generally designated C2 to the relay device D. The latter is adapted to let through current via electrical conductors generally designated C3 whenever required to a small operating motor M so that the latter is caused to rotate in the one or the other direction and thereby shift the three-way valve V so that this lets through a greater or lesser portion of the return water through the shunt Ls to the riser L1b and, corresponding thereto, a lesser or greater portion respectively of the hot water in the feed line L1a to the riser L1b. In this way the temperature of the flow of water to the radiators will be controlled by its being mixed up with return water whereas the temperature of the water in the boiler 1 remains constant.

In Figure 2 there is shown an outdoor or outer thermistor $Hp1$ and the inner thermistor $Hp2$ which is mounted in the riser L1b carrying a heating fluid. The inner and outer thermistors are connected in parallel. A relay device D includes a differential relay having two coils S1 and S2. One side of the coil S1 is connected by means of the conductor 16 to one side of the parallel conected thermistors. One side of the coil S2 is connected through a resistor R1 and a conductor 18 to the other side of the parallel connected thermistors. From an alternating current source 12, alternating voltage is impressed on the point 3 of conductor 18 and on the point 4 of a conductor joining the other end of each of the coils S1 and S2. Thus a current path is formed from point 3 through the two parallel connected thermistors $Hp1$ and $Hp2$ and the coil S1 to the point 4, and a second current path is formed from the point 3 through the resistor R1 and the coil S2 to the point 4. The resistance R1 is preferably set so that, whenever the temperature in the riser L1b has a suitable value in relation to the temperature of the outdoor atmosphere, the two coils S1 and S2 will each receive the same current and, having the same number of turns, will produce the same field strength in ampere turns, the field strength of each of the coils being, of course, directed in opposite directions in the differential relay.

An armature Ar is positioned to respond to the magnetic field resulting from the excitation of coils S1 and S2. The armature Ar will be in a neutral position if the coils field strengths are substantially balanced, or in contact with an upper contact K1 or with a lower contact K2 depending upon the direction of any existing unbalancing field strength between the coils S1 and S2. The armature Ar and its associated contacts K1 and K2 are adapted to control current flowing from an alternating current source 14 through conductors grouped at C3 and delivered to windings SA and SB of a motor M. The windings are adapted to cause the motor armature Am to rotate in either direction depending upon which of the windings is excited. The shaft 5 of the motor is connected through suitable mechanism to cause the valve member 6 to move upwardly or downwardly depending upon the direction of rotation of the shaft 5. When the valve member 6 is moving upwardly toward the seat 7, the communication between the feed line L1a and the output riser L1b will be gradually restricted and, at the same time, communication between a shunt line Ls and the riser L1b is gradually opened and, when the valve member 6 is moving downwardly toward the seat 7', the communication between the feed line L1a and the output riser L1b will be gradually opened and, at the same time, communication between the shunt line Ls and the riser L1b is gradually closed.

The arrangement operates as follows.

If, for instance, the temperature of the atmosphere rises the electrical resistance of the thermistor $Hp1$ will fall whereby the resulting current through the coil S1 will increase in relation to the current through the coils S2 the relay being then unbalanced and attracting its armature Ar, for instance, upwards so that a current path is closed through the contact K1 and the winding SA. The armature Am of the motor is then put into rotation in such a direction that the valve V begins to restrict the hot water from the line L1a and let through an increased quantity of the cool return water through the shunt Ls. Hereby the temperature in the riser L1b is reduced and the thermistor $Hp2$ is cooled down. The electrical resistance thereof is hereby increased and the resulting current passing through the coil S1 is reduced until such a condition of equilibrium is reached in which the relay is balanced and drops its armature Ar which again returns to its neutral position in which the winding SA becomes deenergized, the armature Am stops and the valve member 6 remains in its position reached. If the regulating movement is exaggerated there will follow an operation in the opposite direction because the unbalance of the relay will be directed in the opposite direction, the armature Ar strikes the second contact K2, the second motor winding SB is energized and the armature Am rotates in the opposite direction and so on.

Figure 3:
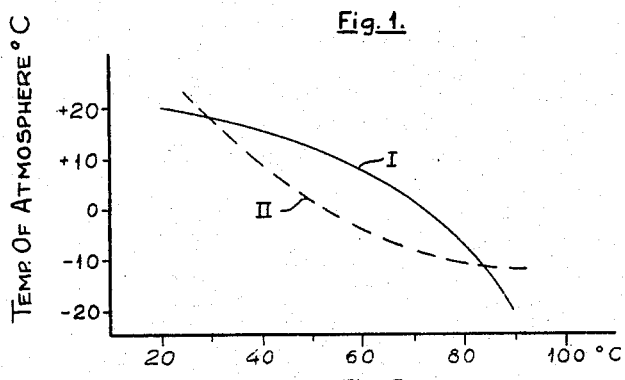
Figure 3 is a diagram showing temperature response curves for the apparatus shown in Figures 2 and 4.

If in Fig. 3 the ordinate designates the temperature of the atmosphere in degrees centigrade and the abscissa the temperature of the riser L1b in degrees centigrade. A curve I is obtained showing the functional relation between said two quantities for the apparatus shown in Figure 2. Said curve is, however, bent upwards meaning that a certain change in the air temperature causes a less change in the temperature of the riser at low atmospheric temperatures than at high atmospheric temperatures.

In the modified embodiment shown in Fig. 4 the outer thermistor $Hs1$ and the inner thermistor $Hs2$ are connected in series so that the current through the coil S1 will be inversely proportional to the sum of the resistances of the thermistors $Hs1$ and $Hs2$.

Then a curve of regulation is obtained according to the dotted line designated II in Fig. 3. This is bent downwards meaning that the regulation is more sensitive for variations in the atmospheric temperature when this is low than when it is high.

Generally, however, it is desired that the curve of regulation concerning the functional connection between the temperatures of the atmosphere and of the riser should be approximately a straight line. According to the present invention the series connection may be combined with the parallel connection as is indicated in Fig. 5. According to this figure two outer thermistors $Hs1$ and $Hp1$ as well as two inner thermistors $Hs2$ and $Hp2$ are used the thermistors $Hs1$ and $Hs2$ being then interconnected in series whereas the thermistors $Hp1$ and $Hp2$ are interconnected in parallel. This combined system of thermistors results generally in a straightening out of the curve shape. The steepness of the curve may be adjusted by means of a shunt resistance $Rs$ included in parallel, for instance, with the thermistor $Hp1$. To counteract the reduction in resistance caused thereby a further series resistance $Rv$ may be included. Further series resistances $R2$ and $R3$ may be included to establish a suitable starting position between the thermistors connected in parallel and the thermistors connected in series. The leads 16 and 18 are connected with leads 16 and 18 of Figure 2 when the thermistor arrangement shown in Figure 5 is substituted for the thermistor arrangement shown in Figure 2 or Figure 4.

Figure 6:
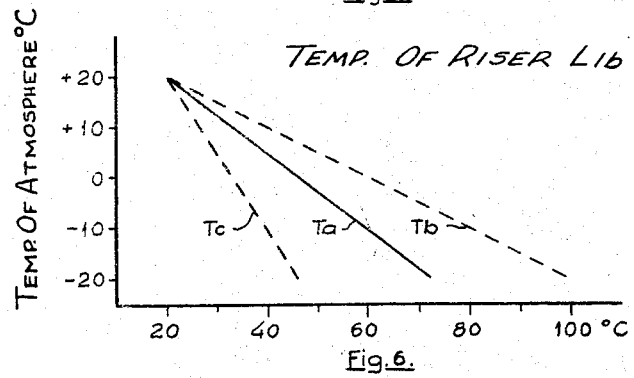
Figure 6 is a diagram illustrating the temperature response operation of the apparatus according to Figure 5.

The circuit arrangement according to Fig. 5 is characterized by the diagram in Fig. 6 the curve $Ta$ drawn in full lines indicating the functional relation at a certain value of the shunt resistance $Rs$. If the latter is reduced the curve $Tb$ may be obtained, by way of example, and if the resistance is increased the curve $Tc$ may be obtained.

In the embodiment shown in Fig. 7 the outer thermistors are subdivided into part thermistors, i. e. the series thermistor $Hs1$ into the part thermistors $Hss1$ and $Hss2$ which are interconnected in series whereas the parallel thermistor $Hp1$ is subdivided into two part thermistors $Hps1$ and $Hps2$ also interconnected in series. The advantage of this arrangement will be understood in connection with the explanation of Fig. 9.

In the embodiment shown in Fig. 8 the series thermistor $Hs1$ is subdivided into two part thermistors $Hsp1$ and $Hsp2$ interconnected in parallel whereas the parallel thermistor $Hp1$ is subdivided into two part thermistors $Hpp1$ and $Hpp2$ also interconnected in parallel.

With respect to both Figs. 7 and 8 the number of part thermistors may be greater than two but the number thereof in the branch corresponding to the series thermistor $Hs1$ should preferably be equal to the number in the branch corresponding to the parallel thermistor $Hp1$.

Figure 9:
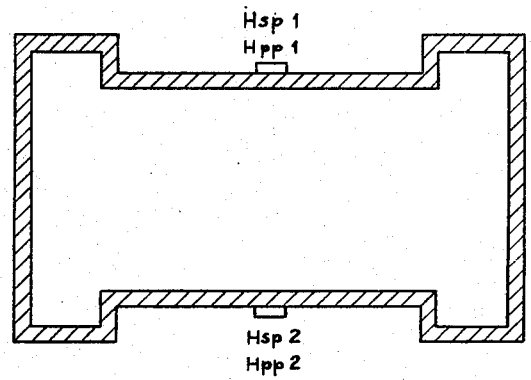
Figure 9 illustrates an arrangement of part thermistors as may be used in a large building.

Part thermistors are of importance when there is involved a large building or other structure in which the conditions of temperature and sun radiation may be different in different parts of the building or the like as is indicated in the plan section of a building shown in Fig. 9 in which the side of the house turned upwards on the drawing, for instance, may be facing nearly the south and its side turned downwards on the drawing may face nearly the north. In applying the circuit diagram shown in Fig. 8 the part thermistors $Hsp1$ and $Hpp1$, i. e. one part thermistor of each kind, may be placed at the same place on the south side of the house whereas part thermistors $Hsp2$ and $Hpp2$ being also one part thermistor of each kind are provided on the north side of the house. Further such groups may, of course, be provided at other places at or in the body of the house. Then the controlled temperature of the water in the riser will apparently be the combined result of the temperature and radiation conditions in the different places of the body of the house.

Figure 10:
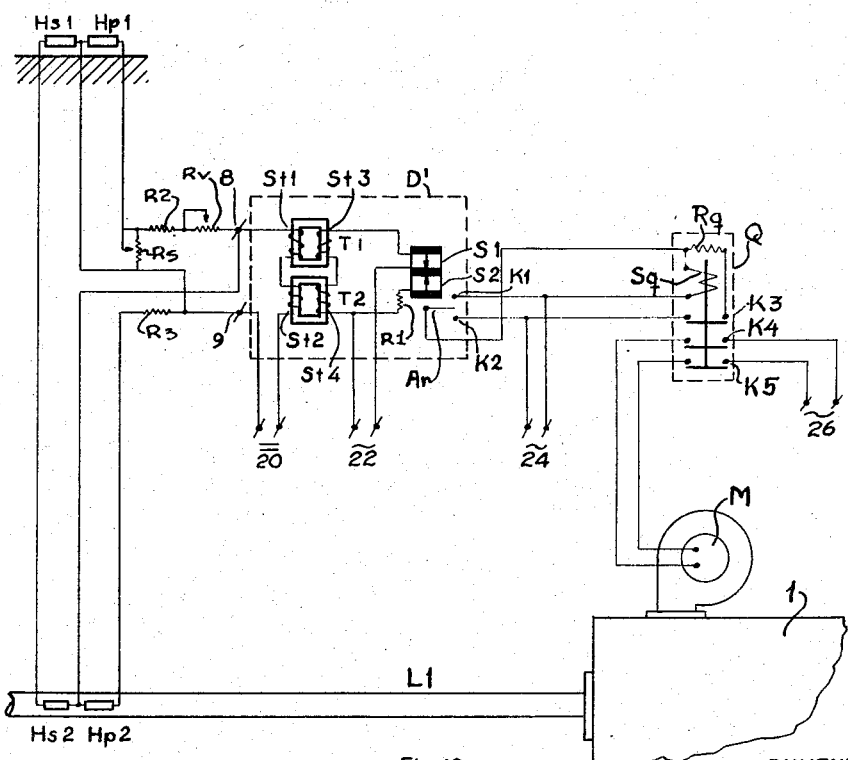
Figure 10 is a more detailed circuit diagram showing a particularly preferred embodiment of the invention.

It has been found that the operation of an arrangement according to the invention and the exactness of the regulation obtained thereby may be considerably increased by using the relay device $D'$ indicated in Fig. 10. In this example it has been assumed that the outer and inner thermistors are interconnected in the manner indicated in Fig. 5. The one terminal 9 of the thermistor arrangement is then connected to the one pole of an electric direct current source 20 whereas the other terminal 8 is connected to the one winding $St1$ of a transformer $T1$. Said winding is connected in series with a winding $St2$ of a second transformer $T2$ which winding is connected in turn to the opposite pole of the direct current source. The secondary windings $St3$ and $St4$ are also interconnected in series and associated with the two coils $S1$ and $S2$ in similar manner as before and are fed from an electric alternating current source 22. The series connection between the two pairs of coils of the transformer is so made that, if at a certain moment of time the windings $St1$ and $St3$ of the one transformer counteract one another, the windings $St2$ and $St4$ of the second transformer cooperate at the same time and vice versa. Such a set of interconnected transformers form saturable reactors and provide a so called transducer. Depending on the different amperage of the direct current the inductance of the windings $St3$ and $St4$ will be different and the amplitude of the alternating current through the coil $S1$ will be controlled thereby. In this way the transducer acts as a magnetic amplifier and powerful amplification of those variations is obtained which occur in the combined resistance of the thermistors in the control circuit. The increased sensitivity results in the temperature in the riser being brought to follow more exactly even small variations in the temperature and radiation in the atmosphere.

In Fig. 10 there has further been shown the modification which the contacts $K1$, $K2$ and the armature $Ar$ are connected to a control member other than a valve, i. e. an auxiliary relay $Q$ including a solenoid $Sq$ interconnected between the contact $K1$ and the armature $Ar$. The armature of the solenoid actuates three contacts $K3$, $K4$ and $K5$ of which the contact $K3$ controls a connection between the contact $K2$ and the resistance $Rq$ the opposite terminal of which is connected to that terminal of the solenoid facing the armature $Ar$. The contacts $K4$ and $K5$ control the current from a current source 26 to a driving motor $M$ which is employed, for instance, for a feeding device for supplying combustible oil to an oil burner in a heating boiler 1 from which the riser $L1$ derives its hot water.

When the temperature of the riser $L1$ is too low, the relay $D'$ operates to close the armature $Ar$ against the contact $K2$ and a current path is formed from the one pole of the current source 24 via the contact $K2$, the armature $Ar$ and the coil $Sq$ and to the opposite pole of the current source. The solenoid $Sq$ is energized and the contacts $K3$, $K4$ and $K5$ are closed the motor $M$ then putting the oil burner set into operation. The water in the boiler 1 is heated and the temperature in the riser $L1$ is raised. Further the resistance $Rq$ is short-circuited via the contact $K3$. Upon a certain rise of the temperature in the riser $L1$ the armature $Ar$ is opened and a holding circuit is formed from the one pole of the current source via the contact $K3$, the resistance $Rq$ and the solenoid $Sq$ to the opposite pole of the current source. Hereby the armature of the solenoid is retained and the motor $M$ is held running until the temperature in the riser $L1$ has risen so far that the armature $Ar$ has been brought to strike against the contact $K1$. Then the solenoid $Sq$ is short-circuited via the contact K1 and its armature is dropped so that the contacts K3, K4 and K5 are opened and the motor M together with the oil burner set stops operation.

Generally, it is obvious that the inventive idea is not restricted to the specific manner in which the temperature of the riser is controlled by means of the relay device D. This may thus actuate, for instance, a contactor of an electric heater provided in the boiler and adapted to heat the water supplied to a riser. Then, for instance, the auxiliary relay Q may be used and its contacts K4 and K5 may connect the electric heater completely or partially into and out of circuit according to the control impulses received from the relay device D.

In similar manner the invention may find its application in boilers with stoker firing apparatus in which, for instance, an electric motor driving the stoker apparatus is controlled, for instance, by an auxiliary relay Q.

I claim:

1. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, magnetically operated means including a coil, and an electrical circuit including said electrical elements and said coil, one of said first and one of said second electrical elements being connected in series, the other of said first and the other of said second electrical elements being connected in parallel and said electrical elements being connected in series with said coil across a power supply, said magnetically operated means acting in response to current flowing through said electrical elements to control a flow of current to said control member to set said control member in response to changes in the temperature of said electrical elements.

2. Apparatus for setting a control member in response to conditions in the atmosphere, said member being adapted to control the temperature of a fluid flowing in a conduit, said apparatus comprising a first pair of temperature responsive electrical elements positioned to be responsive to the tempertaure of the fluid in said conduit, a second pair of temperature responsive electrical elements positioned to be responsive to a temperature outside of and displaced from said conduit, a variable resistance connected in series with one of the electrical elements, a second variable resistance connected in parallel with one of the electrical elements, magnetically operated means including a coil, and an electrical circuit including said electrical elements, said resistances and said coil, one of said first and one of said second electrical elements being connected in series, the other of said first and the other of said second electrical elements being connected in parallel, said electrical elements and said resistances being connected in series with said coil across a power supply, said magnetically operated means acting in response to current flowing through said electrical elements to control a flow of current to said control member to set said control member in response to changes in the temperature of said electrical elements.

3. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a tempertaure outside of and displaced from said conduit, magnetically operated means including a coil, and an electrical circuit including said electrical elements and said coil, one of said first and one of said second electrical elements being connected in series, the other of said first and the other of said second electrical elements being connected in parallel and each of said second pair of electrical elements being divided into an equal number of part elements, a part element of the series connected elements and a part element of the parallel connected elements forming a pair of part elements and the pairs of part elements being adapted to be located remotely with respect to each other, and said electrical elements being connected in series with said coil across a power supply, said magnetically operated means acting in response to current flowing through said electrical elements to control a flow of current to said control member to set said control member in response to changes in the temperature of said electrical elements.

4. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, magnetically operated means including a magnetic amplifier having a coil, and an electrical circuit including said electrical elements and said coil, one of said first and one of said second electrical elements being connected in series and the other of said first and the other of said second electrical elements being connected in parallel and said electrical elements being connected in series with said coil across a power supply, said magnetically operated means acting in response to current flowing through said electrical elements to control a flow of current to said control member to set said control member in response to changes in the temperature of said electrical elements.

5. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, magnetically operated means including a differential relay having a coil, and an electrical circuit including said electrical elements and said coil, one of said first and one of said second electrical elements being connected in series and the other of said first and the other of said second electrical elements being connected in parallel and said electrical elements being connected in series with said coil across a power supply, said magnetically operated means acting in response to current flowing through said electrical elements to control a flow of current to said control member to set said control member in response to changes in the temperature of said electrical elements.

6. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, a transducer, and an electrical circuit including said electrical elements and said transducer, one of said first and one of said second electrical elements being connected in series, the other of said first and the other of said second electrical elements being connected in parallel and said electrical elements being connected to said transducer and in series with a power supply, said transducer acting in response to current flowing through said electrical elements to control a flow of current to said control member to set said control member in response to changes in the temperature of said electrical elements.

7. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, a variable resistance connected in series with one of the electrical elements, a second variable resistance connected in parallel with one of the electrical elements, a transducer, and an electrical circuit including said electrical elements, said resistances and said transducer, one of said first and one of said second electrical elements being connected in series, the other of said first and the other of said second electrical elements being connected in parallel, said electrical elements and said resistances being connected to said transducer and in series with a power supply, said transducer acting in response to current flowing through said electrical elements to control a flow of current to said control member to set said control member in response to changes in the temperature of said electrical elements.

8. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, a transducer, and an electrical circuit including said electrical elements and said transducer, one of said first and one of said second electrical elements being connected in series, the other of said first and the other of said second electrical elements being connected in parallel and each of said second pair of electrical elements being divided into an equal number of part elements, a part element of the series connected elements and a part element of the parallel connected elements forming a pair of part elements and the pairs of part elements being adapted to be located remotely with respect to each other, and said electrical elements being connected to said transducer and in series with a power supply, said transducer acting in response to current flowing through said electrical elements to control a flow of current to said control member to set said control member in response to changes in the temperature of said electrical elements.

9. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, an amplifier, and an electrical circuit including said electrical elements and said amplifier, one of said first and one of said second electrical elements being connected in series, the other of said first and the other of said second electrical elements being connected in parallel and said electrical elements being connected to said amplifier in series with a power supply, said amplifier acting in response to current flowing through said electrical elements to control a flow of current to said control member to set said control member in response to changes in the temperature of said electrical elements.

10. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positoined to be responsive to a temperature outside of and displaced from said conduit, a variable resistance connected in series with one of the electrical elements, a second variable resistance connected in parallel with one of the electrical elements, an amplifier, and an electrical circuit including said electrical elements, said resistances and said amplifier, one of said first and one of said second electrical elements being connected in series, the other of said first and the other of said second electrical elements being connected in parallel, said electrical elements and said resistances being connected to said amplifier and in series with a power supply, said amplifier acting in response to current flowing through said electrical elements to control a flow of current to said control member to set said control member in response to changes in the temperature of said electrical elements.

11. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, electrically operated means, and an electrical circuit including one of said first and one of said second electrical elements being connected in series, the other of said first and the other of said second electrical elements being connected in parallel and said electrical elements being connected in series with said electrically operated means across a power supply, said electrically operated means acting in response to current flowing through said electrical elements to set said control member in response to changes in the temperature of said electrical elements.

12. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, electrically operated means, and an electrical circuit including one of said first and one of said second electrical elements being connected in series, the other of said first and the other of said second electrical elements being connected in parallel and said electrical elements being connected in series with said electrically operated means across a power supply, said electrically operated means acting in response to current flowing through said electrical elements to control a flow of current to said control member to set said control member in response to changes in the temperature of said electrical elements.

13. Apparatus for setting a control member in response to conditions in the atmosphere, said member being adapted to control the temperature of a fluid flowing in a conduit, said apparatus comprising a first pair of temperature responsive electrical elements positioned to be responsive to the temperature of the fluid in said conduit, a second pair of temperature responsive electrical elements positioned to be responsive to a temperature outside of and displaced from said conduit, a variable resistance connected in series with one of the electrical elements, a second variable resistance connected in parallel with one of the electrical elements, electrically operated means, and an electrical circuit including one of said first and one of said second electrical elements being connected in series, the other of said first and the other of said second electrical elements being connected in parallel and said electrical elements being connected in series with said electrically operated means across a power supply, said electrically operated means acting in response to current flowing through said electrical elements to control a flow of current to said control member to set said control member in response to changes in the temperature of said electrical elements.

GÖSTA E. STÅHLBERG.

References Cited in the file of this patent

UNITED STATES PATENTS

| Number | Name | Date |
|---|---|---|
| 1,728,551 | Jennings | Sept. 17, 1929 |
| 2,137,059 | Moreau | Nov. 15, 1938 |
| 2,141,942 | Suits | Dec. 27, 1938 |
| 2,236,624 | Tittwin | Apr. 1, 1941 |
| 2,355,043 | Adlam | Aug. 8, 1944 |
| 2,488,780 | Ray | Nov. 22, 1949 |
| 2,496,860 | Davis | Feb. 7, 1950 |
| 2,545,353 | Gund | Mar. 13, 1951 |
| 2,547,933 | Fitz Gerald | Apr. 10, 1951 |

FOREIGN PATENTS

| Number | Country | Date |
|---|---|---|
| 388,773 | Great Britain | Feb. 20, 1933 |
| 777,297 | France | Nov. 26, 1934 |